US012596405B2

(12) United States Patent
Zhu et al.

(10) Patent No.: US 12,596,405 B2
(45) Date of Patent: Apr. 7, 2026

(54) ELECTRONIC DEVICE

(71) Applicant: VIVO MOBILE COMMUNICATION CO., LTD., Guangdong (CN)

(72) Inventors: Yichen Zhu, Guangdong (CN);
Dingjian Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 204 days.

(21) Appl. No.: 18/513,935

(22) Filed: Nov. 20, 2023

(65) Prior Publication Data

US 2024/0085956 A1      Mar. 14, 2024

Related U.S. Application Data

(63) Continuation of application No. PCT/CN2022/093073, filed on May 16, 2022.

(30) Foreign Application Priority Data

May 20, 2021     (CN) .......................... 202110553915.5

(51) Int. Cl.
*G06F 1/16*            (2006.01)
(52) U.S. Cl.
CPC .......... *G06F 1/1652* (2013.01); *G06F 1/1624* (2013.01); *G06F 1/1656* (2013.01)
(58) Field of Classification Search
CPC .................................................... G06F 1/1652
See application file for complete search history.

(56) References Cited

U.S. PATENT DOCUMENTS

| | | | | |
|---|---|---|---|---|
| 10,082,833 | B2 * | 9/2018 | Chen ...................... | G06F 1/1652 |
| 10,817,022 | B2 * | 10/2020 | Cho ...................... | G06F 3/0487 |

(Continued)

FOREIGN PATENT DOCUMENTS

| | | |
|---|---|---|
| CN | 110149428 A | 8/2019 |
| CN | 110493396 A | 11/2019 |

(Continued)

OTHER PUBLICATIONS

Extended European Search Report for Application No. 22803922.8, dated Sep. 13, 2024, 8 Pages.

(Continued)

*Primary Examiner* — Adrian S Wilson
(74) *Attorney, Agent, or Firm* — BROOKS KUSHMAN P.C.

(57) ABSTRACT

An electronic device including a first housing, where the first housing is provided with a first vibration motor; a second housing, where the second housing is slidably connected to the first housing, and the second housing is provided with a second vibration motor; a flexible display, where a first segment of the flexible display is connected to the first housing, and a second segment of the flexible display is in sliding fit with the second housing; and a first drive mechanism, where the first drive mechanism is disposed in the first housing, the first drive mechanism is connected to the second housing, the first drive mechanism drives the second housing to move with respect to the first housing, enabling the electronic device to switch between a rolled state and an unrolled state, and the second vibration motor moves along with the second housing.

7 Claims, 10 Drawing Sheets

FIG. 7

(56) References Cited

U.S. PATENT DOCUMENTS

| | | | | |
|---|---|---|---|---|
| 10,881,009 B2 * | 12/2020 | Jiang | .................... | G06F 1/1624 |
| 11,632,452 B2 * | 4/2023 | Delaporte | .............. | G09F 9/301 |
| | | | | 345/13 |
| 2011/0025480 A1 | 2/2011 | Hwang et al. | | |
| 2014/0315602 A1 | 10/2014 | Baldwin | | |
| 2017/0139442 A1 | 5/2017 | Yoshizumi | | |
| 2018/0081473 A1 * | 3/2018 | Seo | ......................... | G06F 3/044 |
| 2018/0181164 A1 * | 6/2018 | Chen | .................... | G06F 1/1624 |
| 2019/0261519 A1 * | 8/2019 | Park | ................... | H04M 1/0235 |
| 2020/0117241 A1 | 4/2020 | Yoshizumi | | |
| 2020/0152095 A1 * | 5/2020 | Lee | ......................... | G06F 3/147 |
| 2020/0196460 A1 * | 6/2020 | Myers | .................... | G06F 3/041 |
| 2020/0264660 A1 * | 8/2020 | Song | ................... | H04M 1/0268 |
| 2020/0401187 A1 | 12/2020 | Noh et al. | | |
| 2021/0383727 A1 * | 12/2021 | Han | ...................... | G06F 1/1656 |
| 2023/0156105 A1 * | 5/2023 | Feng | ................... | H04M 1/0268 |
| | | | | 361/679.01 |
| 2023/0259168 A1 | 8/2023 | Gu et al. | | |
| 2023/0401984 A1 * | 12/2023 | Zeng | ....................... | G09F 9/301 |

FOREIGN PATENT DOCUMENTS

| | | | | |
|---|---|---|---|---|
| CN | 210380959 U | 4/2020 | | |
| CN | 112291954 A | 1/2021 | | |
| CN | 112769982 A | 5/2021 | | |
| CN | 113329109 A | 8/2021 | | |
| EP | 4138311 A1 * | 2/2023 | ......... | H04B 7/06962 |

OTHER PUBLICATIONS

First Office Action for Chinese Application No. 202110553915.5, dated Nov. 10, 2022, 6 Pages.

International Search Report and Written Opinion for Application No. PCT /CN2022/093073, dated Aug. 16, 2022, 9 Pages.

\* cited by examiner

131111

132130150110112

150

280

200

220

221

211    212

210

ELECTRONIC DEVICE

CROSS-REFERENCE TO RELATED APPLICATIONS

This application is a continuation of PCT International Application No. PCT/CN2022/093073 filed on May 16, 2022, which claims priority to Chinese Patent Application No. 202110553915.5 filed on May 20, 2021, which are incorporated herein by reference in their entireties.

TECHNICAL FIELD

This application relates to the field of communication technologies, and specifically, to an electronic device.

BACKGROUND

With the development of technology, the performance of electronic devices has been greatly improved, and as a result, the displays of electronic devices are also developing towards large displays.

With the emergence of electronic devices having rollable displays, electronic devices are provided with larger displays while maintaining their traditional appearance. However, due to the significant difference in mass between the extendable portion and the fixed portion of this type of electronic device, when the extendable portion is extended, vibrations of the motor are concentrated in a localized area of the electronic device. This results in a poor transmission effect for the vibrations, leading to a subpar vibration effect in the electronic device.

SUMMARY

An embodiment of this application provides an electronic device, including:

a first housing, where the first housing is provided with a first vibration motor;

a second housing, where the second housing is slidably connected to the first housing, and the second housing is provided with a second vibration motor;

a flexible display, where a first segment of the flexible display is connected to the first housing, and a second segment of the flexible display is in sliding fit with the second housing; and a first drive mechanism, where the first drive mechanism is disposed in the first housing, the first drive mechanism is connected to the second housing, the first drive mechanism drives the second housing to move with respect to the first housing, enabling the electronic device to switch between a rolled state and an unrolled state, and the second vibration motor moves along with the second housing.

Figure 1:
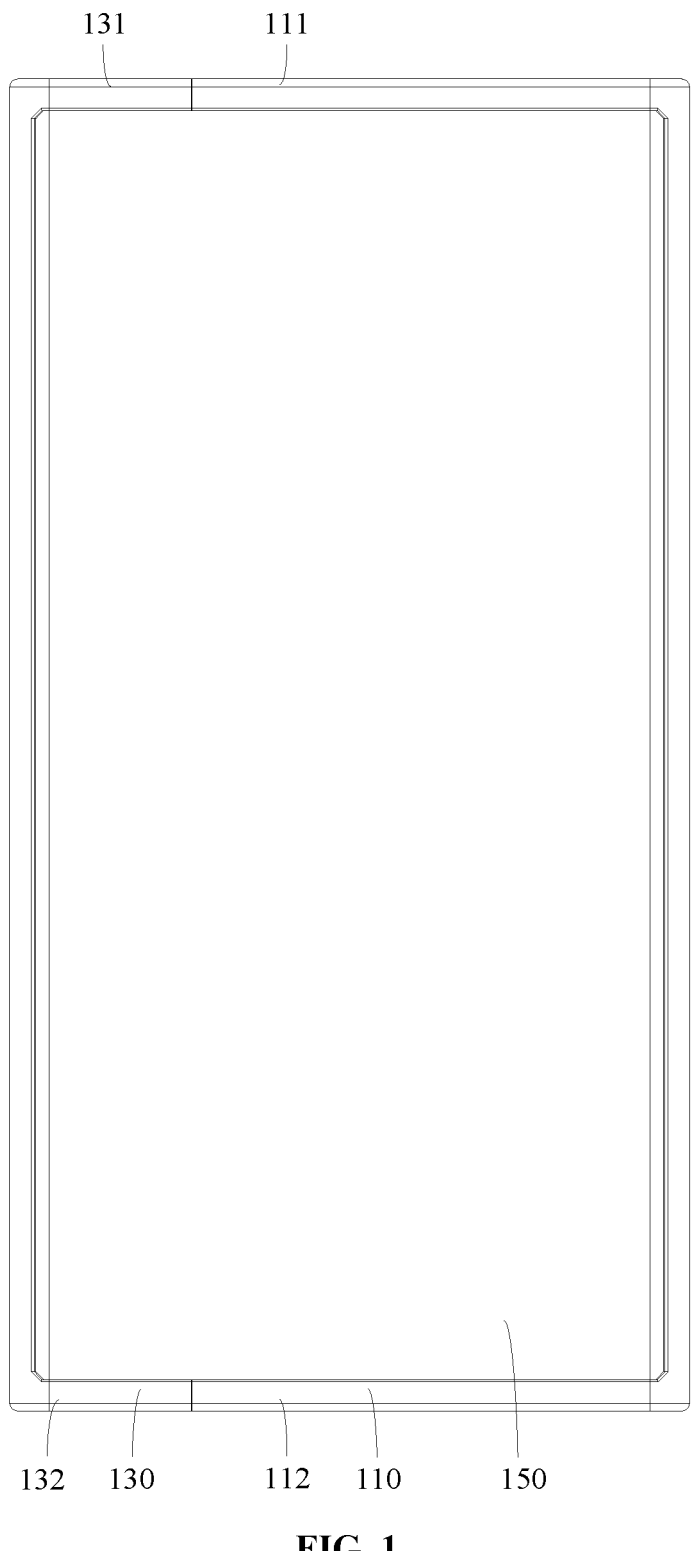
FIGS. 1 to 4 are schematic structural diagrams of an electronic device when a flexible display is in different states according to an embodiment of this application.

Reference numerals in the accompanying drawings are described as follows:

110. first housing, 111. first top portion, 112. first bottom portion;
120. first vibration motor;
130. second housing, 131. second top portion, 132. second bottom portion;
140. second vibration motor;
150. flexible display;
160. first drive mechanism, 161. first drive source, 162. speed reducer, 163. output shaft, 164. first gear, 165. second gear, 166. transmission belt, 166a. extension portion;
170. first bracket, 171. slide slot, 172. avoidance hole, 173. limit portion, 174. fit slot;
180. second bracket, 181. slide rail, 182. connection portion;
190. circuit board, 191. primary board, 192. secondary board;
200. flexible electrical connection wire;
210. second drive mechanism, 211. second drive source, 212. connection shaft;
220. winding mechanism, and 221. groove;
230. limit member;
240. battery, 250. sound chamber support, 260. connection member, 270. roller, and 280. first coil spring.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application without creative efforts shall fall within the protection scope of this application.

The terms "first", "second", and the like in this specification and claims of this application are used to distinguish between similar objects rather than to describe a specific order or sequence. It should be understood that the data used in this way is interchangeable in appropriate circumstances such that the embodiments of this application can be implemented in other orders than the order illustrated or described herein. In addition, objects distinguished by "first", "second", and the like are generally of a same type, and the quantities of the objects are not limited. For example, there may be one or more first objects. In addition, "and/or" in the specification and claims represents at least one of connected objects, and the character "/" generally indicates that the contextually associated objects have an "or" relationship.

With reference to the accompanying drawings, an electronic device provided in the embodiments of this application are described below in detail by using specific embodiments and application scenarios thereof.

Figure 2:
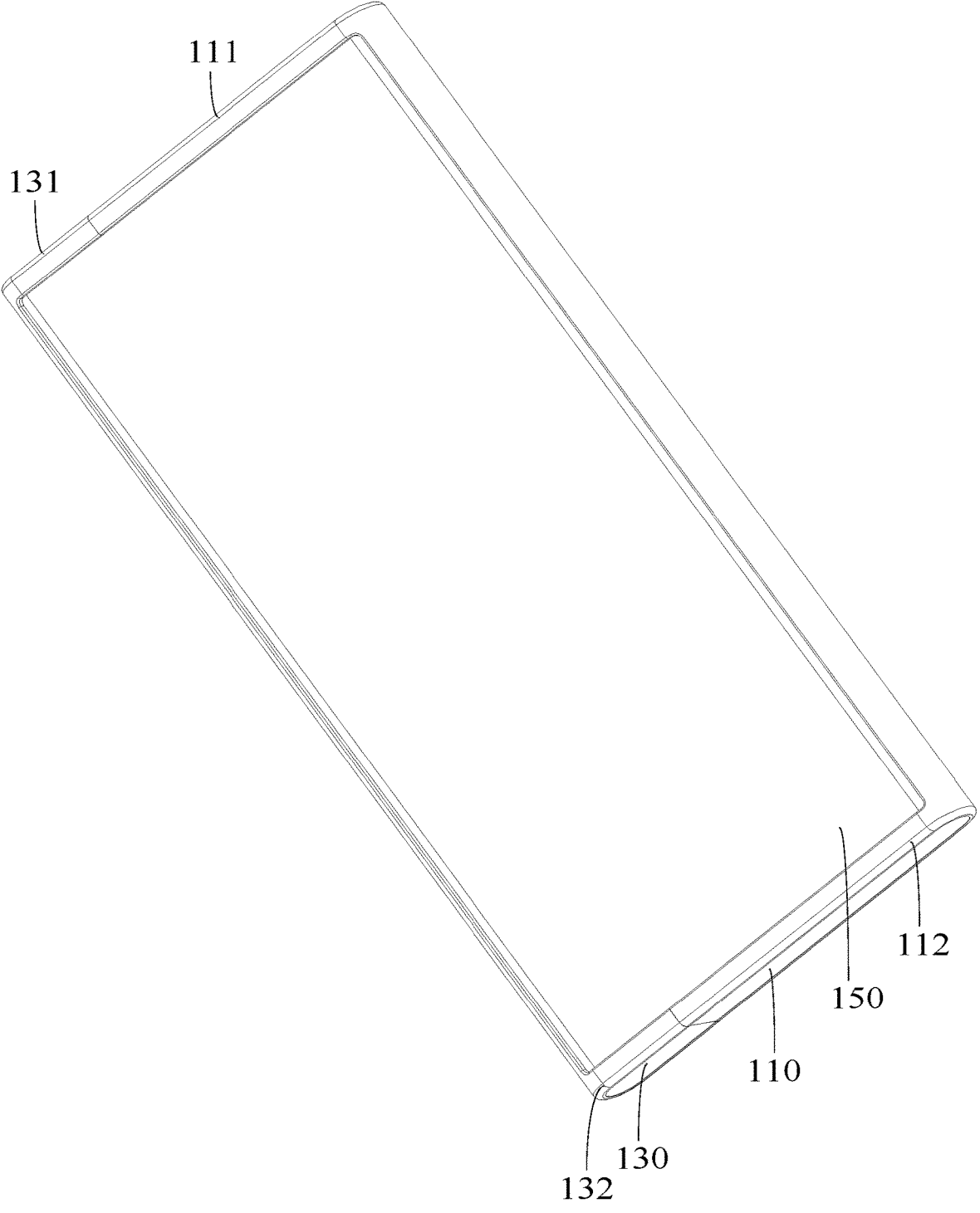
Figure 3:
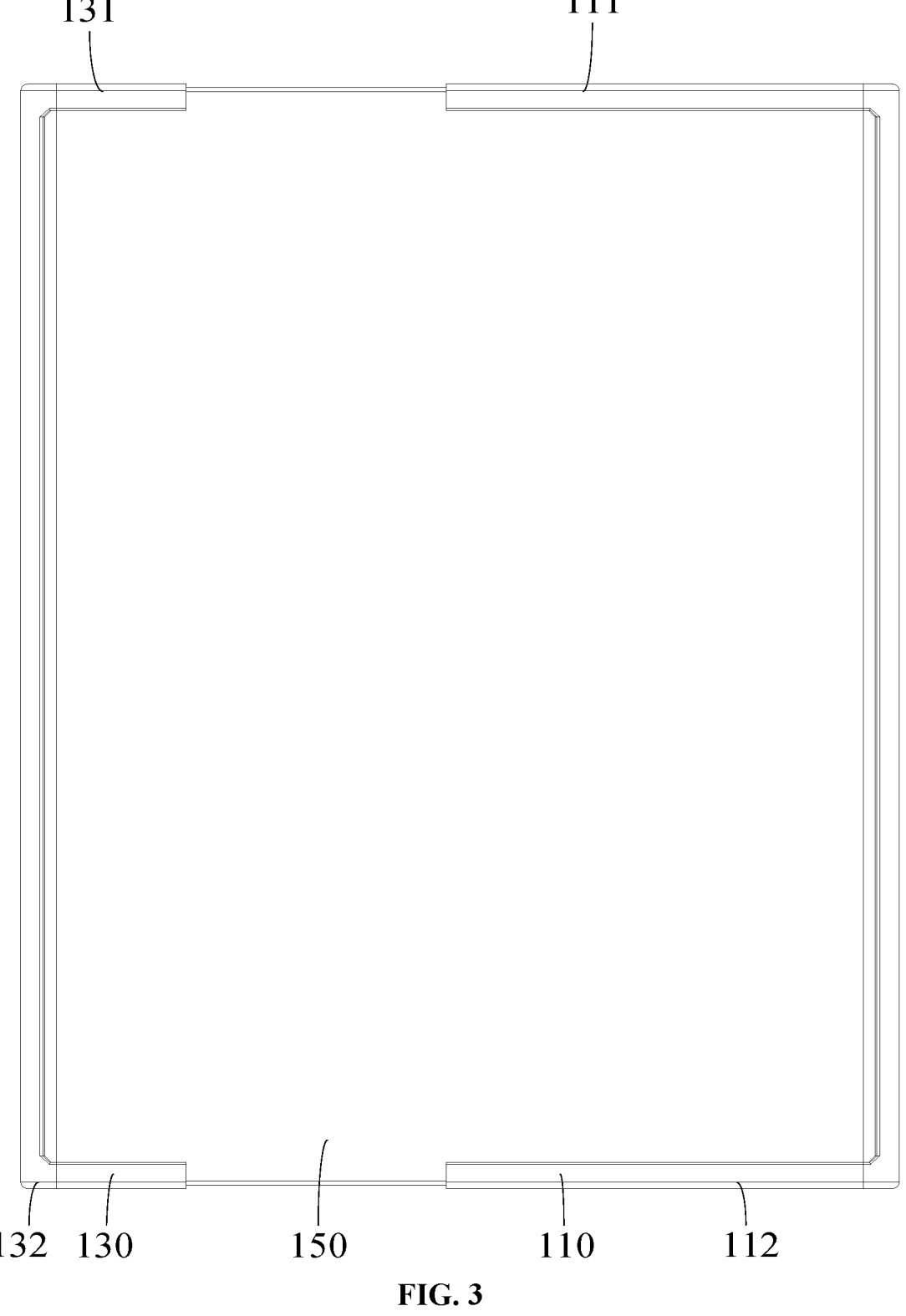
Figure 4:
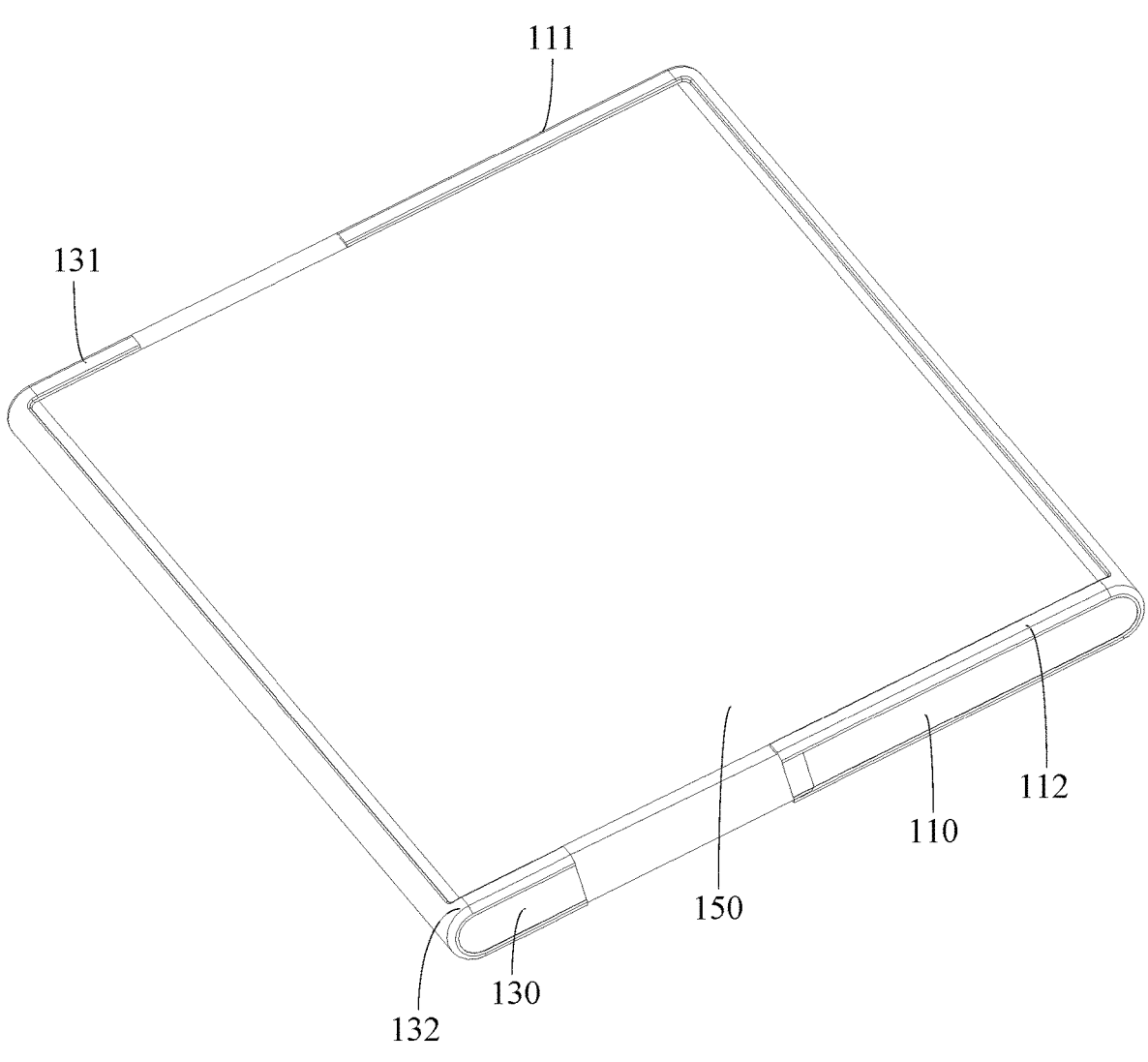
Figure 5:
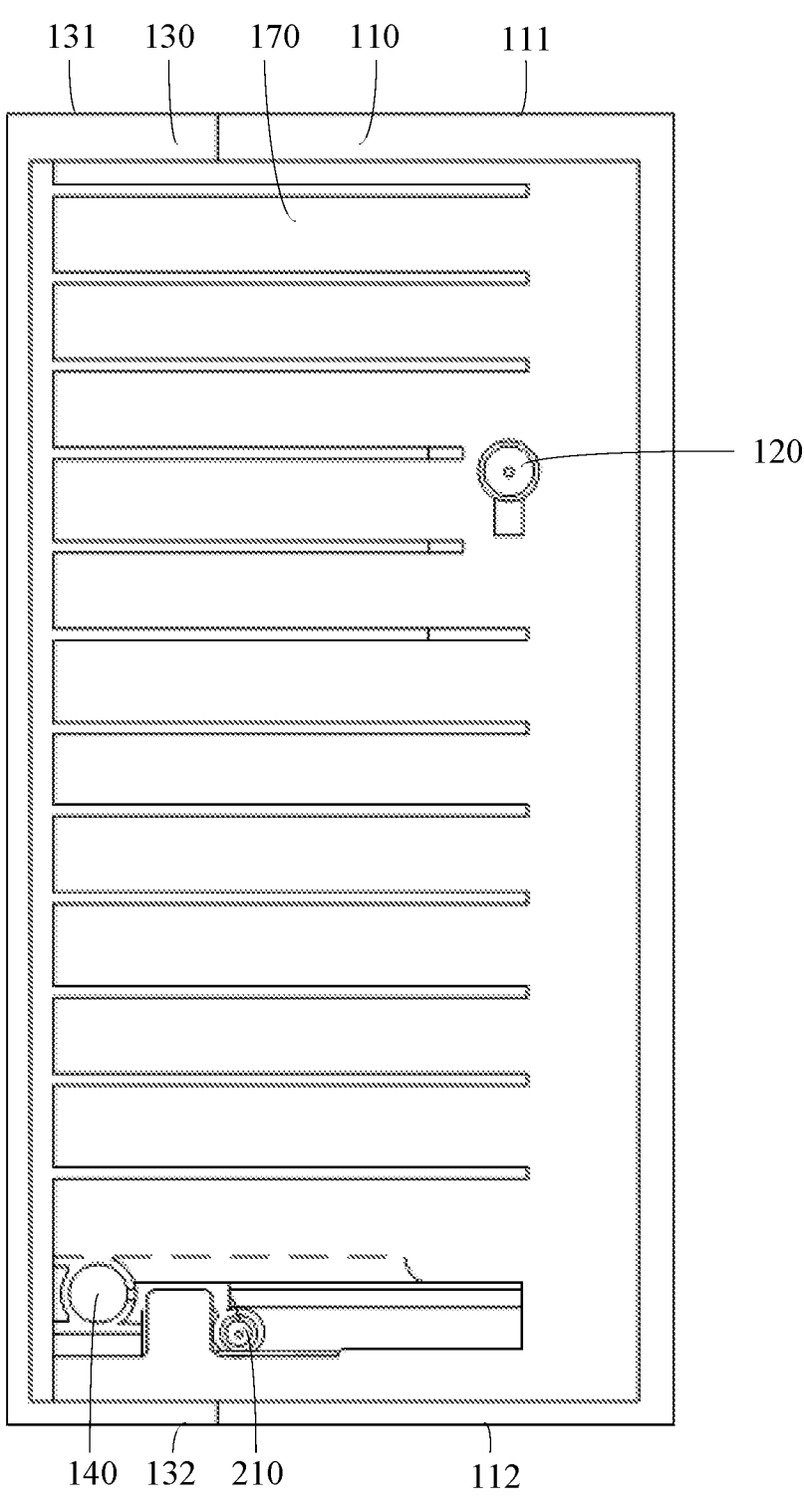
FIGS. 5 to 7 are schematic structural diagrams of partial structure of an electronic device when a flexible display is in different states according to an embodiment of this application.
Figure 6:
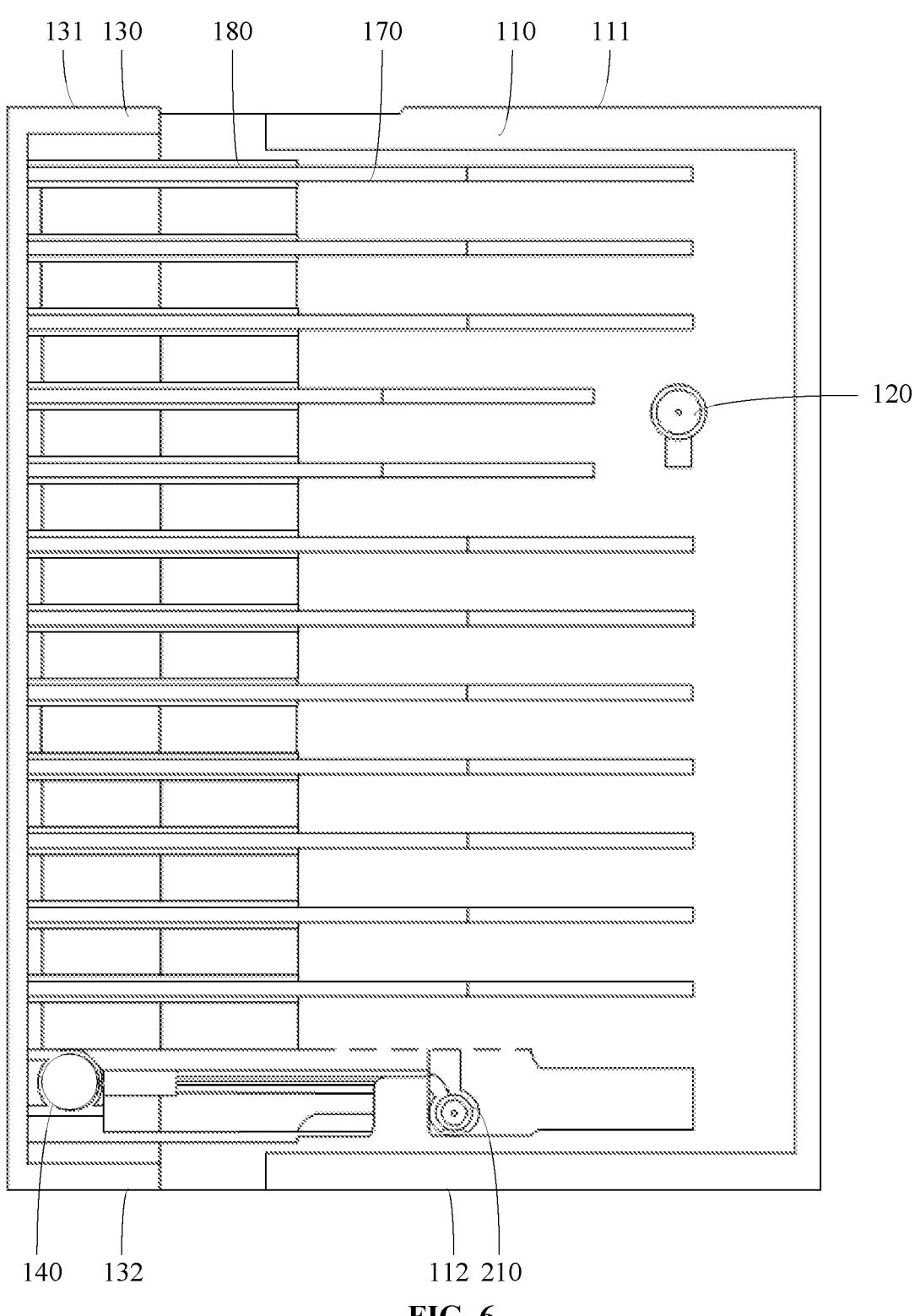
Figures 7, 8:
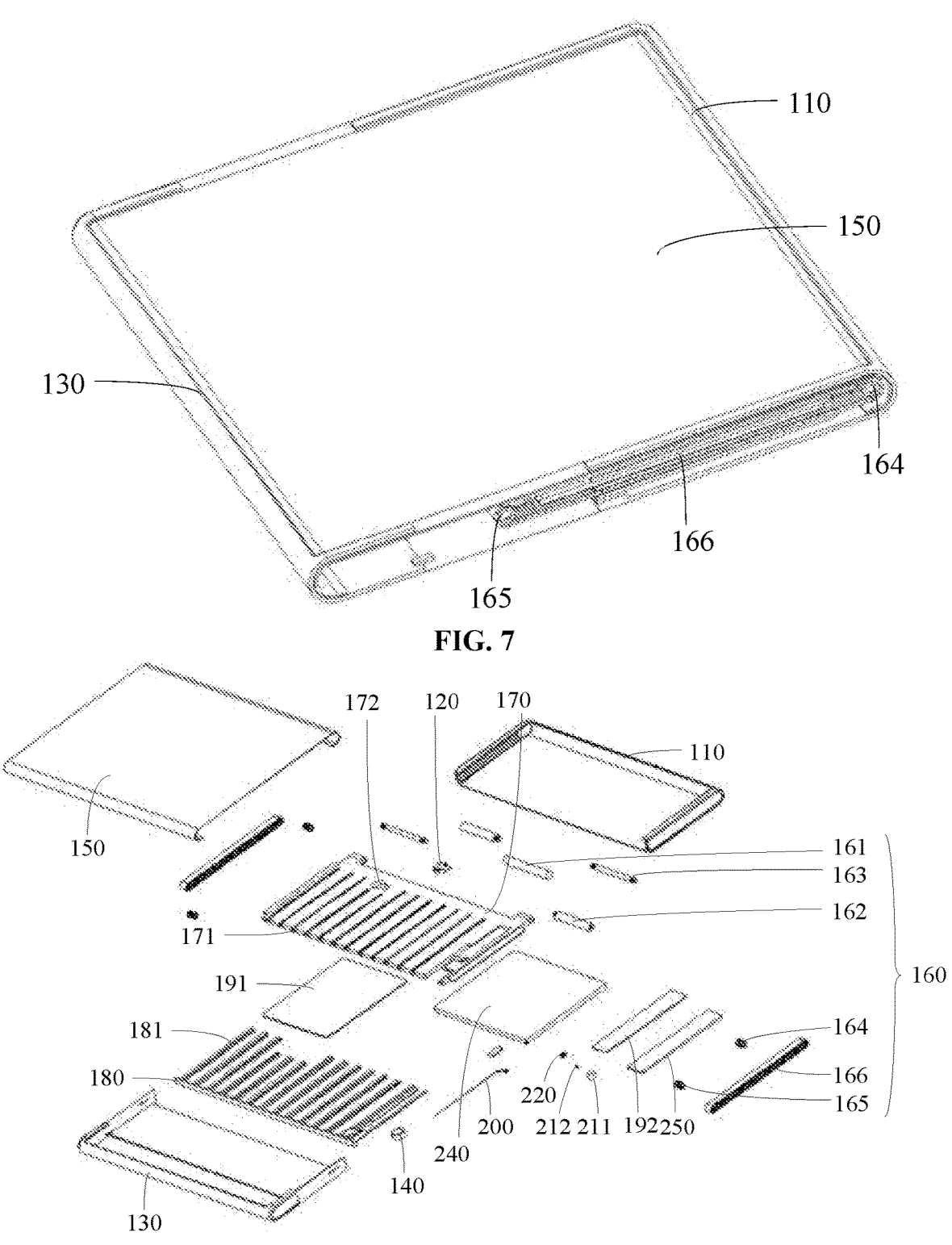
FIG. 8 is an exploded view of an electronic device according to an embodiment of this application.
Figure 9:
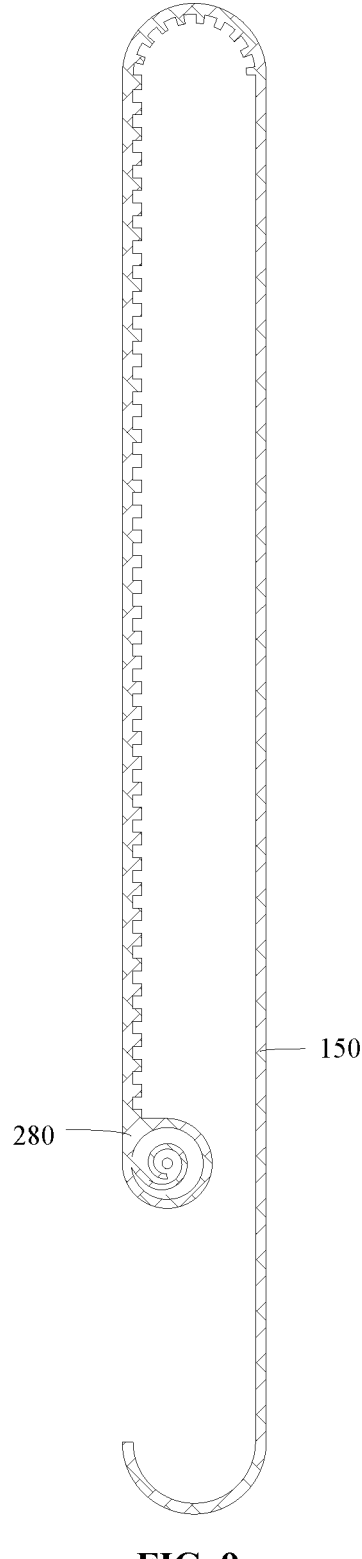
FIGS. 9 and 10 are schematic diagrams of partial structure of an electronic device according to an embodiment of this application.
Figures 10, 11:
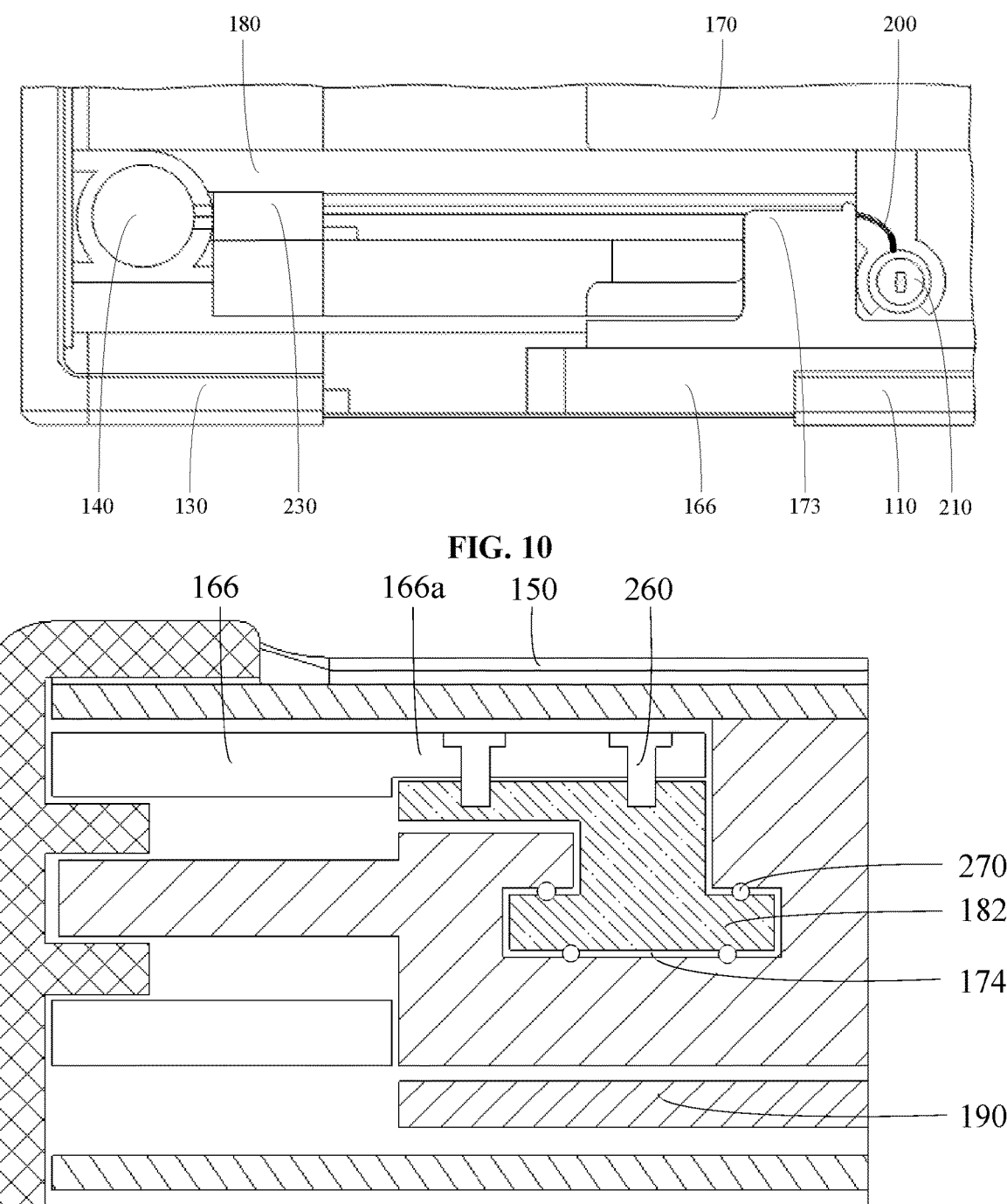
FIGS. 11 and 12 are cross-sectional diagrams of partial structure of an electronic device according to an embodiment of this application.
Figure 12:
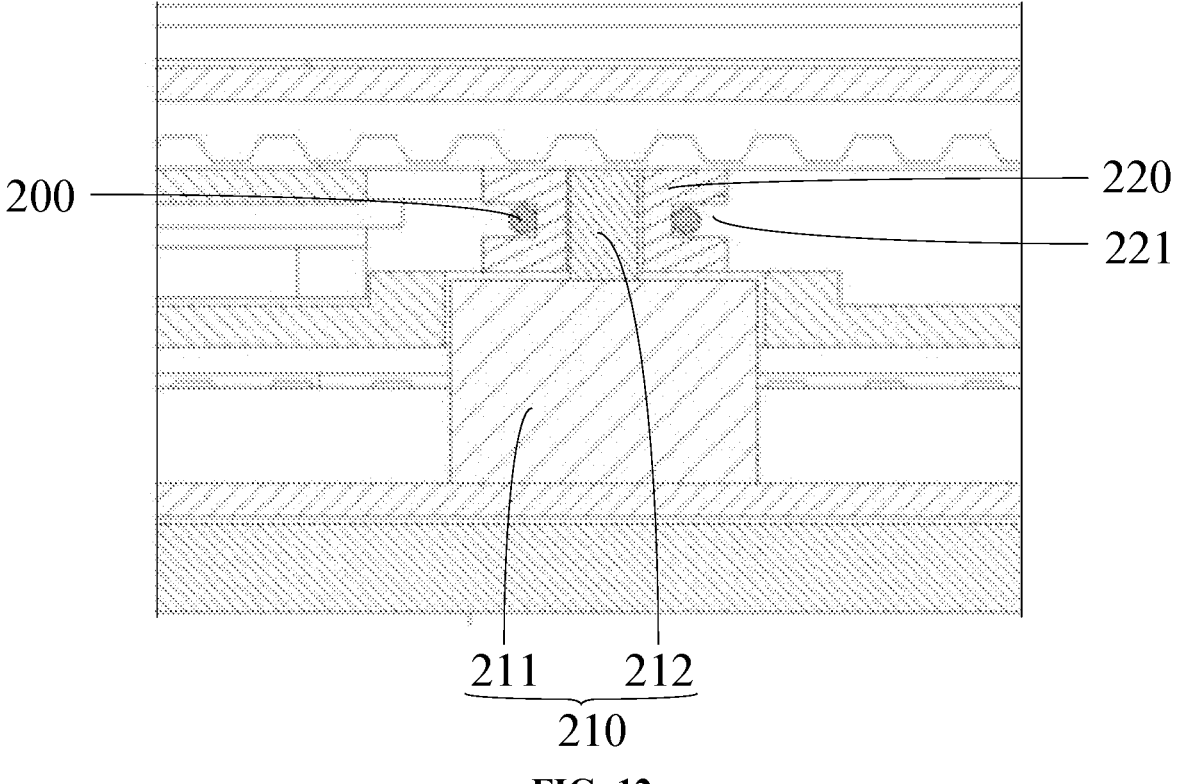

As shown in FIGS. 1 to 12, the embodiments of this application provide an electronic device. The electronic device includes a first housing 110, a first vibration motor 120, a second housing 130, a second vibration motor 140, a flexible display 150, and a first drive mechanism 160.

Moreover, the electronic device includes a circuit board 190, where the circuit board 190 is disposed in the first housing 110, and the circuit board 190 may further include a primary board 191 and a secondary board 192.

The first housing 110 and a second housing 130 are both basic components of the electronic device, providing a foundation for mounting other parts of the electronic device. The first housing 110 is provided with the first vibration motor 120. The second housing 130 is slidably connected to the first housing 110, meaning the second housing 130 can move with respect to the first housing 110. The second housing 130 is provided with the second vibration motor 140. When the user triggers a vibration operation, the first vibration motor 120 and/or the second vibration motor 140 vibrates, thus providing vibration feedback to the user.

A first segment of the flexible display 150 is connected to the first housing 110. Optionally, the first segment of the flexible display 150 may be connected to the first housing 110 through adhesion, which is not limited in the embodiments of this application. A second segment of the flexible display 150 is in sliding fit with the second housing 130. In other words, the second segment of the flexible display 150 can move with respect to the second housing 130.

The first drive mechanism 160 is disposed in the first housing 110, the first drive mechanism 160 is connected to the second housing 130, the first drive mechanism 160 drives the second housing 130 to move with respect to the first housing 110, enabling the electronic device to switch between a rolled state and an unrolled state, and the second vibration motor 140 moves along with the second housing 130. In a case that the electronic device is in the rolled state, the overall size of the electronic device is relatively small, and the first vibration motor 120 is close to the second vibration motor 140. When the electronic device is in the unrolled state, the overall size of the electronic device is relatively large, and the first vibration motor 120 is far from the second vibration motor 140.

Optionally, the first drive mechanism 160 may include a first drive source 161, an output shaft 163, a first gear 164, a second gear 165, and a transmission belt 166. Optionally, the first drive source 161 may be a motor, a cylinder, a hydraulic cylinder, a piezoelectric ceramic, a shape memory alloy, and the like. The motor features small size, high efficiency, and convenient control; the cylinder and hydraulic cylinder feature large output force as well as stable and reliable performance; and the piezoelectric ceramic and shape memory alloy feature environmental friendliness. The specific form of the first drive source 161 is not limited in the embodiments of this application. The transmission belt 166 is wound around the first gear 164 and the second gear 165 and meshed with the first gear 164 and the second gear 165. The first gear 164 is connected to the output shaft 163, and the flexible display 150 and the second housing 130 are both connected to the transmission belt 166. Optionally, a side of the flexible display 150 facing the transmission belt 166 is provided with first drive teeth, and the outer surface of the transmission belt 166 is provided with second drive teeth, the second drive teeth being meshed with the first drive teeth, so as to connect the flexible display 150 to the transmission belt 166. The first drive source 161 drives, via the first gear 164, the transmission belt 166 to move, and the transmission belt 166 drives the flexible display 150 and the second housing 130 to move. When the first drive source 161 operates, the output shaft 163 rotates to drive the first gear 164 to rotate, and the transmission belt 166 wound around the first gear 164 and the second gear 165 moves to drive the flexible display 150 and the second housing 130 to move. In the embodiments of this application, such belt drive transmission manner used features a simple structure and stable transmission, and allows the driving force to be transferred across a large shaft distance and among multiple shafts, making the electronic device more stable during extension.

Optionally, the first drive mechanism 160 disclosed by the embodiments of this application may further include a speed reducer 162. The speed reducer 162 is co-axially disposed with the output shaft 163 of the first drive source 161, which can obtain a smaller rotation speed, so as to increase the torque, thereby more powerfully driving the transmission belt 166 to move. In addition, the speed reducer 162, the transmission belt 166, the first gear 164, and the second gear 165 can be each provided in two groups, and the two groups of transmission belts 166, first gears 164, and second gears 165 are disposed on two sides of the flexible display 150 respectively, so as to apply driving forces to both sides of the flexible display 150, enabling the flexible display 150 to move more stably.

In the embodiments of this application, when the user needs to experience weak vibration feedback, regardless of whether the electronic device is in the rolled state or the unrolled state, either the first vibration motor 120 or the second vibration motor 140 can be set to work so as to provide the user with weak vibration. When the user needs to experience strong vibration feedback, regardless of whether the electronic device is in the rolled state or the unrolled state, both the first vibration motor 120 and the second vibration motor 140 can be set to work simultaneously so as to provide the user with strong vibration. Thus, the second vibration motor 140 can work when the electronic device is in the unrolled state, and because the second vibration motor 140 is disposed in the second housing 130, the vibration of the second vibration motor 140 can be quickly transferred to the region where the second housing 130 is located, thereby improving the vibration effect of the electronic device.

In an embodiment, the second vibration motor 140 is fixedly connected to the second housing 130. The fixed connection may be bonding connection, riveting connection, screw connection, or the like, which is not limited in the embodiments of this application. In this embodiment, the position of the second vibration motor 140 relative to the second housing 130 remains unchanged, meaning that the second vibration motor 140 always vibrates at a same position with respect to the second housing 130. Such arrangement is simple and allows for easy layout of components in the internal space of the electronic device.

In another embodiment, the second vibration motor 140 is slidably connected to the second housing 130. One of the second vibration motor 140 and the second housing 130 is provided with a guide rail and the other is provided with a guide slot, the guide rail fitting with the guide slot. Alternatively, one of the second vibration motor 140 and the second housing 130 is provided with a guide hole and the other is provided with a guide rod, the guide hole fitting with the guide rod. The specific manner of sliding connection between the second vibration motor 140 and the second housing 130 is not limited in the embodiments of this application. In this embodiment, the second vibration motor 140 can slide to many positions of the second housing 130 for vibration according to the requirement of the user. Therefore, the foregoing arrangement manner can bring richer vibration experience to the user.

In an optional embodiment, the first housing 110 has a first top portion 111 and a first bottom portion 112 that are opposite in a first direction, and the second housing 130 has a second top portion 131 and a second bottom portion 132 that are opposite in the first direction. The first vibration motor 120 is close to the first top portion 111 and the second vibration motor 140 is close to the second top portion 131. Alternatively, the first vibration motor 120 is close to the first bottom portion 112 and the second vibration motor 140 is close to the second bottom portion 132, the first direction being perpendicular to a sliding direction of the second housing 130. In the foregoing two arrangement manners, the first vibration motor 120 and the second vibration motor 140 are both located on the same side of the electronic device. When the first vibration motor 120 and the second vibration motor 140 vibrate simultaneously, it is easy to cause strong vibration in partial region and weak vibration in partial region of the electronic device, leading to a large difference between the vibrations, felt by the user, in different regions of the electronic device. Therefore, in another optional embodiment, the first vibration motor 120 is close to the first bottom portion 112, and the second vibration motor 140 is close to the second top portion 131. Alternatively, the first vibration motor 120 is close to the first top portion 111, and the second vibration motor 140 is close to the second bottom portion 132. In the two embodiments, regardless of whether the electronic device is in the rolled state or the unrolled state, the first vibration motor 120 and the second vibration motor 140 are located on two sides of the electronic device respectively and diagonally arranged. Therefore, when the first vibration motor 120 and the second vibration motor 140 vibrate simultaneously, the vibration is uniformly distributed on the electronic device, providing the user with better vibration feedback. Further, because the second vibration motor 140 has a changeable position while also needing to always stay connected to the circuit board 190, the components configured for electrical connection occupy a large space. In addition, a large number of components are disposed on the first top portion 111 or the second top portion 131, leading to a tight space for arrangement. Therefore, the second vibration motor 140 being close to the second bottom portion 132 is more conducive to arranging the components in the electronic device.

In another optional embodiment, the electronic device further includes a first bracket 170 and a second bracket 180. The first bracket 170 is connected to the first housing 110, and the second bracket 180 is connected to the second housing 130. The first bracket 170 and the second bracket 180 can provide support force for the flexible display 150, making the surface of an effective display region of the flexible display 150 smoother, and providing the user with better use experience during a touch operation. The first bracket 170 is provided with a plurality of slide slots 171, the second bracket 180 is provided with a plurality of slide rails 181, the slide rails 181 are in one-to-one correspondence with the slide slots 171, and the second vibration motor 140 is disposed on the second bracket 180. When the electronic device switches between the rolled state and the unrolled state, the slide rail 181 moves along the slide slot 171, and the slide slot 171 guides the movement of the slide rail 181, allowing the second bracket 180 to move along a preset direction of the slide slot 171, so as to avoid the deviation of the second bracket 180 and thus to avoid wrinkles on the surface of the flexible display 150. In addition, the slide rail 181 being in sliding fit with the slide slot 171 allows the electronic device to have a more stable internal structure when switching between the rolled state and the unrolled state. In addition, when the electronic device is in the unrolled state, a gap is present between adjacent slide rails 181, which is equivalent to that the entire second bracket 180 has a hollow region. When the first vibration motor 120 provides vibration feedback, the vibration is weakened when transferred to the gap. Therefore, the second vibration motor 140 is disposed on the second bracket 180, such that the second vibration motor 140 can be used to provide vibration feedback, thereby improving the vibration effect of the electronic device. In addition, the second bracket 180 can be used to transfer the vibration generated by the second vibration motor 140 in a large range, helping to improve the vibration effect of the electronic device.

The transmission belt 166 may be connected to the second bracket 180 in various manners. For example, an end portion of the second bracket 180 can be directly bonded to a side surface of the transmission belt 166. However, in such connection manner, because the transmission belt 166 is relatively thin, the connection area and the connection strength between the transmission belt 166 and the second bracket 180 are both small. In view of this, in another embodiment, the transmission belt 166 is provided with an extension portion 166a protruding along an axial direction of the first gear 164. The second bracket 180 is provided with a connection portion 182, the connection portion 182 extending along the movement direction of the second bracket 180. The extension portion 166a can be connected to the connection portion 182 via a connection member 260, and the transmission belt 166 drives, via the extension portion 166a, the second bracket 180 to move. The extension portion 166a does not affect the fit between the first gear 164 as well as the second gear 165 and the transmission belt 166, and therefore the shape and size of the extension portion 166a as well as the connection position between the extension portion 166a and the connection portion 182 can be optimized, allowing for a larger connection area between the extension portion 166a and the connection portion 182, thereby enhancing the connection strength therebetween.

Optionally, the extension portion 166a has a first surface and a second surface, the first surface and the second surface being back away from each other in the thickness direction of the electronic device. The first surface can be flush with the outer surface of the transmission belt 166, and the second surface can be recessed with respect to the inner surface of the transmission belt 166. This can ensure a sufficient thickness of the extension portion 166a and reserve a large arrangement space for the connection portion 182. The connection portion 182 can be connected to the second surface of the extension portion 166a, and the size of the second surface can be designed to be large, thereby increasing the connection area between the connection portion 182 and the extension portion 166a.

In a further embodiment, the first bracket 170 is provided with a fit slot 174, and the connection portion 182 is in sliding fit with the fit slot 174. When the transmission belt 166 drives the second bracket 180 to move, the fit slot 174 can limit the movement direction of the second bracket 180, so as to implement the guiding function. Further, the fit slot 174 is provided with a roller 270 inside, and the connection portion 182 fits with the fit slot 174 via the roller 270. The connection portion 182 and the fit slot 174 are both in rolling fit with the roller 270. Such fit manner produces a small friction force, allowing the connection portion 182 and the fit slot 174 to slide with respect to each other more smoothly, prolonging the service life of the two.

Further, in an optional embodiment, the first vibration motor 120 is disposed on the circuit board 190. Optionally, the first vibration motor 120 may be disposed on the primary board 191 or the secondary board 192, which is not limited in the embodiments of this application. The first vibration motor 120 may be located between the circuit board 190 and the first bracket 170. In this embodiment, the arrangement manner of the first vibration motor 120 is likely to cause a large spacing between the circuit board 190 and the first bracket 170, leading to a large thickness of the electronic device. Therefore, in another optional embodiment, the first bracket 170 is provided with an avoidance hole 172, and the first vibration motor 120 is at least partly located in the avoidance hole 172. In this embodiment, the first vibration motor 120 being disposed in the avoidance hole 172 can shorten the spacing between the first bracket 170 and the circuit board 190, helping to make the electronic device thinner. In addition, the connection area between the first vibration motor 120 in the avoidance hole 172 and the first bracket 170 is larger. This is accordingly more conducive to transferring the vibration generated by the first vibration motor 120, thereby improving the vibration effect of the electronic device.

In an optional embodiment, the second vibration motor 140 may be provided with a first electrical connection portion and a second electrical connection portion. When the electronic device is in the rolled state, the first electrical connection portion is electrically connected to the circuit board 190, and the second electrical connection portion is disconnected from the circuit board 190. When the electronic device is in the unrolled state, the positions of the first electrical connection portion and the second electrical connection portion with respect to the circuit board 190 change, such that the first electrical connection portion is disconnected from the circuit board 190 and the second electrical connection portion is electrically connected to the circuit board 190. Such a structure can adapt to the position change of the second vibration motor 140. However, the first electrical connection portion and the second electrical connection portion provided for the second vibration motor 140 are limited, and thus the extension position of the electronic device is limited, which does not help the electronic device to stay in any extension position. Therefore, in another optional embodiment, the electronic device may further include a flexible electrical connection wire 200, one end of the flexible electrical connection wire 200 is electrically connected to the circuit board 190. Optionally, the flexible electrical connection wire 200 can be electrically connected to either the primary board 191 or the secondary board 192, which is not limited in the embodiments of this application. The other end of the flexible electrical connection wire 200 is electrically connected to the second vibration motor 140, and the flexible electrical connection wire 200 deforms with moving of the second housing 130. In this case, the length of the flexible electrical connection wire 200 after the deformation can meet various spacing changes between the second vibration motor 140 and the circuit board 190. Therefore, the flexible electrical connection wire 200 can always be connected to the second vibration motor 140 and the circuit board 190 with no limitation on the extension position of the electronic device. Such structure, thus, allows the electronic device to stay in any extension position.

Further, in an optional embodiment, in a case that the electronic device is in the rolled state, to neatly accommodate the flexible electrical connection wire 200 in the electronic device so as to prevent the components of the flexible electrical connection wire 200 and the electronic device from being entangled, the electronic device may further include a second drive mechanism 210 and a winding mechanism 220. The winding mechanism 220 is rotatably disposed in the first housing 110, and the second drive mechanism 210 is disposed in the first housing 110. The second drive mechanism 210 is connected to the winding mechanism 220, and the second drive mechanism 210 drives the winding mechanism 220 to rotate, enabling the flexible electrical connection wire 200 to be wound around the winding mechanism 220 or released from the winding mechanism 220. In this case, when the electronic device switches from the rolled state to the unrolled state, the second drive mechanism 210 can drive the winding mechanism 220 to rotate clockwise, enabling the flexible electrical connection wire 200 to be released from the winding mechanism 220. When the electronic device switches from the unrolled state to the rolled state, the second drive mechanism 210 can drive the winding mechanism 220 to rotate counterclockwise, enabling the flexible electrical connection wire 200 to be wound around the winding mechanism 220, thereby neatly accommodating the flexible electrical connection wire 200, and preventing the flexible electrical connection wire 200 and components of the electronic device from being entangled.

In an optional embodiment, the second drive mechanism 210 can include a second coil spring. One end of the second coil spring is connected to the first housing 110, and the other end of the second coil spring is connected to the winding mechanism 220. The second coil spring drives the winding mechanism 220 to rotate. In a case that the electronic device is in the rolled state, at least part of the flexible electrical connection wire 200 is wound around the winding mechanism 220. In this embodiment, when the electronic device switches from the rolled state to the unrolled state, the winding mechanism 220 continuously releases the flexible electrical connection wire 200, and the second coil spring continuously accumulates elastic potential energy, exerting tension on the flexible electrical connection wire 200. When the electronic device switches from the unrolled state to the rolled state, the winding mechanism 220 continuously winds the flexible electrical connection wire 200, and the second coil spring continuously releases elastic potential energy, exerting tension on the flexible electrical connection wire 200. It can be learned that the flexible electrical connection wire 200 is always in a tightened state, which is likely to cause a breakage at the connection between the flexible electrical connection wire 200 and the second vibration motor 140. Therefore, in another optional embodiment, the second drive mechanism 210 includes a second drive source 211 and a connection shaft 212, where the connection shaft 212 is connected to the second drive source 211, and the winding mechanism 220 fits around the connection shaft 212. Optionally, the second drive source 211 may be a motor, a cylinder, a hydraulic cylinder, a piezoelectric ceramic, a shape memory alloy, and the like. The motor features small size, high efficiency, and convenient control; the cylinder and hydraulic cylinder feature large output force as well as stable and reliable performance; and the piezoelectric ceramic and shape memory alloy feature environmental friendliness and protection. The specific form of the second drive source 211 is not limited in the embodiments of this application. When the second drive source 211 drives the connection shaft 212 to rotate, the connection shaft 212 can drive the winding mechanism 220 to rotate, so as to wind the winding mechanism 220 or release the flexible electrical connection wire 200. As the second drive source 211 drives the winding mechanism 220 to rotate, the flexible electrical connection wire 200 between the winding mechanism 220 and the second vibration motor 140 can be controlled to be in a released state, thereby improving the connection reliability between the flexible electrical connection wire 200 and the second vibration motor 140.

In an optional embodiment, in a case that the electronic device is in the rolled state, a major part of the flexible electrical connection wire 200 is wound around the winding mechanism 220. If the flexible electrical connection wire 200 on the winding mechanism 220 is not limited, the flexible electrical connection wire 200 on the winding mechanism 220 is likely to deviate from the winding mechanism 220. Therefore, the winding mechanism 220 may be provided with a groove 221, where the flexible electrical connection wire 200 is wound into the groove 221 or released from the groove 221 under the action of the second drive mechanism 210. In this embodiment, the groove 221 can limit the position of the flexible electrical connection wire 200 wound in the groove 221, so as to prevent the flexible electrical connection wire 200 from deviating from the winding mechanism 220, which is more conducive to winding the flexible electrical connection wire 200 or releasing the flexible electrical connection wire 200 by the winding mechanism 220.

In another optional embodiment, when the first drive mechanism 160 drives the second housing 130 to move with respect to the first housing 110 so as to enable the electronic device to switch between the unrolled state and the rolled state, the flexible electrical connection wire 200, when wound or released, is likely to deviate, which does not help the winding mechanism 220 to wind or release the flexible electrical connection wire 200. Therefore, the second bracket 180 is provided with a limit member 230, and part of the flexible electrical connection wire 200 is located between the second bracket 180 and the limit member 230. In this embodiment, the limit member 230 can prevent the flexible electrical connection wire 200 from deviating, which is more conducive to winding or releasing the flexible electrical connection wire 200 by the winding mechanism 220.

As mentioned above, when the first drive mechanism 160 drives the second housing 130 to move with respect to the first housing 110, so as to make the electronic device switch between the unrolled state and the rolled state, the flexible electrical connection wire 200, when wound or released, is likely to deviate, which does not help the winding mechanism 220 to wind or release the flexible electrical connection wire 200. To resolve this problem, the first bracket 170 is provided with a limit portion 173, the flexible electrical connection wire 200 penetrating through the limit portion 173. In this embodiment, the limit portion 173 can prevent the flexible electrical connection wire 200 from deviating, which is more conducive to winding or releasing the flexible electrical connection wire 200 by the winding mechanism 220.

In an optional embodiment, the electronic device further includes a first coil spring 280, a circuit board 190, a battery 240, and a sound chamber support 250 that are disposed in the first housing 110. The circuit board 190 may include a primary board 191 and a secondary board 192. One end of the first coil spring 280 is connected to the first housing 110 and the other end of the first coil spring 280 is connected to the flexible display 150. When the electronic device switches from the unrolled state to the rolled state, the first coil spring 280 continuously retracts back the flexible display 150 via its retraction force, making the unretracted flexible display 150 in a tensioned state, thereby preventing the flexible display 150 from being loosen to cause wrinkles. The first drive mechanism 160 can be connected to the primary board 191 via a flexible circuit board, and the battery 240 can be connected to the primary board 191 via a board-to-board connector, the board-to-board connector being thin. The second drive mechanism 210 can be connected to the secondary board 192. The sound chamber support 250 can be configured to support a sound chamber, so as to reduce the impact of the vibration of the sound chamber on the electronic device. In addition, the primary board 191, the battery 240, the secondary board 192, and the sound chamber support 250 are arranged sequentially side by side, such that the electronic device is thin so as to improve the use experience.

The electronic device disclosed in the embodiments of this application may be a smartphone, a tablet computer, an e-book reader, a wearable device (for example, a smartwatch), a game console, or other devices. A specific type of the electronic device is not limited in the embodiments of this application.

The foregoing describes the embodiments of this application with reference to the accompanying drawings. However, this application is not limited to the foregoing specific implementations. The foregoing specific implementations are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. An electronic device, comprising:

a first housing, wherein the first housing is provided with a first vibration motor;

a second housing, wherein the second housing is slidably connected to the first housing, and the second housing is provided with a second vibration motor;

a flexible display, wherein a first segment of the flexible display is connected to the first housing, and a second segment of the flexible display is in sliding fit with the second housing; and a first drive mechanism, wherein the first drive mechanism is disposed in the first housing, the first drive mechanism is connected to the second housing, the first drive mechanism drives the second housing to move with respect to the first housing, enabling the electronic device to switch between a rolled state and an unrolled state, and the second vibration motor moves along with the second housing;

wherein the electronic device further comprises a first bracket and a second bracket, wherein the first bracket is connected to the first housing, the second bracket is connected to the second housing, the first bracket is provided with a plurality of slide slots, the second bracket is provided with a plurality of slide rails, the slide rails are in one-to-one correspondence with the slide slots, and the second vibration motor is disposed on the second bracket;

wherein the electronic device further comprises a circuit board, wherein the circuit board is disposed in the first housing, the first vibration motor is disposed on the circuit board, the first bracket is provided with an avoidance hole, and the first vibration motor is at least partly located in the avoidance hole; or, wherein the electronic device further comprises a circuit board and a flexible electrical connection wire, wherein the circuit board is disposed in the first housing, one end of the flexible electrical connection wire is electrically connected to the circuit board, the other end of the flexible electrical connection wire is electrically connected to the second vibration motor, and the flexible electrical connection wire deforms with moving of the second housing.

2. The electronic device according to claim 1, wherein the second vibration motor is slidably connected to the second housing.

3. The electronic device according to claim 1, wherein the first housing has a first top portion and a first bottom portion that are opposite in a first direction, and the first vibration motor is close to the first top portion; and the second housing has a second top portion and a second bottom portion that are opposite in the first direction, and the second vibration motor is close to the second bottom portion; wherein the first direction is perpendicular to a sliding direction of the second housing.

4. The electronic device according to claim 1, wherein the electronic device further comprises a second drive mechanism and a winding mechanism, wherein the winding mechanism is rotatably disposed in the first housing, the second drive mechanism is disposed in the first housing, the second drive mechanism is connected to the winding mechanism, the second drive mechanism drives the winding mechanism to rotate, enabling the flexible electrical connection wire to be wound around the winding mechanism or released from the winding mechanism.

5. The electronic device according to claim 4, wherein the second drive mechanism further comprises a second drive source and a connection shaft, wherein the connection shaft is connected to the second drive source, and the winding mechanism fits around the connection shaft.

6. The electronic device according to claim 4, wherein the winding mechanism is provided with a groove, wherein under action of the second drive mechanism, the flexible electrical connection wire is wound into the groove or released from the groove.

7. The electronic device according to claim 4, wherein the second bracket is provided with a limit member, and the flexible electrical connection wire is partly located between the second bracket and the limit member.

* * * * *